(12) United States Patent
Shu

(10) Patent No.: US 11,397,537 B2
(45) Date of Patent: Jul. 26, 2022

(54) DATA RESTORATION METHOD AND APPARATUS

(71) Applicant: Huawei Technologies Co., Ltd., Shenzhen (CN)

(72) Inventor: Zhi Shu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 16/814,009

(22) Filed: Mar. 10, 2020

(65) Prior Publication Data

US 2020/0210091 A1 Jul. 2, 2020

Related U.S. Application Data

(63) Continuation of application No. PCT/CN2018/087749, filed on May 22, 2018.

(30) Foreign Application Priority Data

Sep. 14, 2017 (CN) .......................... 201710826758.4
Feb. 11, 2018 (CN) .......................... 201810143181.1

(51) Int. Cl.
*G06F 3/06* (2006.01)
*G06F 16/245* (2019.01)

(52) U.S. Cl.
CPC .......... *G06F 3/0647* (2013.01); *G06F 3/0619* (2013.01); *G06F 3/0641* (2013.01); *G06F 3/0659* (2013.01); *G06F 3/0674* (2013.01); *G06F 16/245* (2019.01)

(58) Field of Classification Search
None
See application file for complete search history.

(56) References Cited

U.S. PATENT DOCUMENTS

| 9,367,397 | B1 | 6/2016 | Xie et al. |
| 9,727,273 | B1* | 8/2017 | Dantkale ............. G06F 11/2094 |
| 2008/0177809 | A1* | 7/2008 | Murayama ............ G06F 3/0665 |
| 2012/0233417 | A1 | 9/2012 | Kalach et al. |
| 2016/0203058 | A1 | 7/2016 | Chavda et al. |
| 2016/0328413 | A1 | 11/2016 | Xie et al. |
| 2018/0307616 | A1* | 10/2018 | Takeda .................. G06F 3/0641 |

FOREIGN PATENT DOCUMENTS

| CN | 102236586 A | 11/2011 |
| CN | 103019887 A | 4/2013 |
| CN | 103559101 A | 2/2014 |
| CN | 103617260 A | 3/2014 |
| CN | 106503051 A | 3/2017 |

OTHER PUBLICATIONS

Liu, W., "Improve Restore Speed in Deduplication Systems Using Segregated Cache," Sep. 19, 2016, XP033018541, 6 pages.
Han, W., "The Design and Implementation of Disaster Backup System Data Deduplication Engin," Jun. 2014, 113 pages.

* cited by examiner

*Primary Examiner* — Stephanie Wu
(74) *Attorney, Agent, or Firm* — Conley Rose, P.C.

(57) ABSTRACT

In a data restoration method and apparatus, after a data restoration request is received, all metadata corresponding to each deduplication index is determined based on a deduplication index corresponding to metadata of each data slice in backup data. Then, the data slice is stored to a distribution location described in each piece of metadata corresponding to the deduplication index.

20 Claims, 7 Drawing Sheets

DATA RESTORATION METHOD AND APPARATUS

CROSS-REFERENCE TO RELATED APPLICATIONS

This is a continuation of Int'l Patent App. No. PCT/CN2018/087749 filed on May 22, 2018, which claims priority to Chinese Patent App. No. 201810143181.1 filed on Feb. 11, 2018 and Chinese Patent App. No. 201710826758.4 filed on Sep. 14, 2017, all of which are incorporated by reference.

TECHNICAL FIELD

Embodiments of the disclosure relate to the storage field, and in particular, to a data restoration method and apparatus.

BACKGROUND

In some approaches, to ensure security of data, the data is usually backed up and stored, but an amount of data that needs to be stored is doubled due to backup and storage. To reduce space occupied by backup data in a storage device, the backup data needs to be processed by using a deduplication technology, to reduce duplicate data in the backup data.

When performing a process of storing the backup data, a backup server slices the backup data, and calculates a hash value of each data slice. Data slices having a same hash value include same data. To reduce space occupied by duplicate data in the storage device, only one of a plurality of data slices having a same hash value is stored in a deduplication file.

During restoration of same data in all data slices having a same hash value, to ensure that the backup server can find, based on metadata of all the data slices having the same hash value, data in only one data slice stored in the deduplication file, the backup server sequentially searches for the deduplication index in a storage order of all the data slices based on a correspondence between a same deduplication index and the metadata of each of all the data slices having the same hash value, reads the data slices to which the deduplication index points, and sequentially restores the data in all the data slices having the same hash value.

Therefore, when restoring the backup data, the backup server needs to search for the same deduplication index many times, and read, from the storage device many times, the data slices corresponding to the same deduplication index. Such frequent access to the storage device increases communication load between the backup server and the storage device, reduces data restoration efficiency, and also shortens a service life of the storage device.

SUMMARY

A data restoration method and apparatus. According to the data restoration method, a storage device is prevented from being frequently accessed to obtain a data slice corresponding to the deduplication index, a service life of the storage device is prolonged, communication load between a backup server and the storage device is reduced, and data restoration efficiency is improved.

According to a first aspect, a data restoration method is provided. The method is performed by a backup server. According to the method, after receiving a data restoration request, the backup server searches for metadata of each data slice in the backup data based on an identifier that is of the backup data and that is included in the data restoration request, where the backup data includes several data slices, and the metadata of the data slice is used to describe a distribution location of the data slice in the backup data. The data restoration request further includes a target disk identifier, and the data restoration request is used to instruct to restore the backup data to a target disk. Then, the backup server searches for a deduplication index corresponding to the metadata of each data slice, where the deduplication index is used to indicate a data slice backed up in a storage device, and metadata of a plurality of data slices having same data content corresponds to a same deduplication index. Then, the backup server searches for the data slice to which the deduplication index points and that is located in the storage device, and writes the data slice to the target disk based on a correspondence between the deduplication index and all metadata corresponding to the deduplication index and based on a distribution location described in each piece of metadata corresponding to the deduplication index.

According to the method, the backup server determines, based on the deduplication index corresponding to the metadata of each data slice in the backup data, all metadata corresponding to each deduplication index. Then, after obtaining the data slice to which the deduplication index points and that is stored in the storage device, the backup server stores the data slice to the distribution location described in each piece of metadata corresponding to the deduplication index. For restoration of a plurality of data slices that have same data content and that correspond to a same deduplication index, the storage device is prevented from being frequently accessed to obtain, many times, the data slice to which the deduplication index points and that is stored in the storage device, a service life of the storage device is prolonged, communication load between the backup server and the storage device is reduced, and data restoration efficiency is improved.

With reference to the first aspect, in a first possible implementation, after the backup server searches for the deduplication index corresponding to the metadata of each data slice, the method further includes: storing, by the backup server, a correspondence between the deduplication index and the distribution location described in each piece of metadata corresponding to the deduplication index.

With reference to the first aspect or the first implementation of the first aspect, in a second implementation, the searching for, by the backup server, a deduplication index corresponding to the metadata of each data slice includes: querying, by the backup server, a deduplication index table based on the identifier of the backup data; and querying, by the backup server, each deduplication index in the deduplication index table.

With reference to the second implementation of the first aspect, in a third implementation, the method further includes: determining, by the backup server, a quantity of pieces of all the metadata corresponding to the deduplication index; and storing, by the backup server, a correspondence between the deduplication index and the quantity of pieces of all the metadata corresponding to the deduplication index.

According to a second aspect, a data restoration apparatus is provided, including various modules configured to perform the data restoration method according to any one of the first aspect or the possible implementations of the first aspect. The modules may be implemented by hardware, or may be implemented by executing corresponding software by hardware. The hardware or the software includes one or more modules corresponding to the foregoing functions.

According to a third aspect, a backup server is provided, including a memory and a processor, where the memory is configured to store a software program, and the processor runs the software program stored in the memory, to perform the method according to any one of the first aspect or the possible implementations of the first aspect.

According to a fourth aspect, a computer readable storage medium is provided. The computer readable storage medium stores an instruction. When the instruction is run on a backup server, the backup server is enabled to perform the method according to any one of the first aspect or the possible implementations of the first aspect.

According to a fifth aspect, a computer program product including an instruction is provided. When the computer program product is run on a backup server, the backup server is enabled to perform the method according to any one of the first aspect or the possible implementations of the first aspect.

According to a sixth aspect, a data restoration method is provided. The method is performed by a backup server and includes: receiving a data restoration request, where the data restoration request includes a target disk identifier and an identifier of backup data, the data restoration request is used to instruct to restore the backup data to a target disk corresponding to the target disk identifier, and the backup data includes several data slices; after receiving the data restoration request, searching for metadata of the backup data based on the identifier of the backup data, where the metadata of the backup data includes a deduplication index and metadata of each data slice included in the backup data, the deduplication index is used to indicate a data slice backed up in a storage device, a same deduplication index corresponds to metadata of a plurality of data slices having same data content, and the metadata of the data slice is used to describe a distribution location of the data slice in the backup data; searching for, by the backup server, the data slice to which the deduplication index points and that is located in the storage device; and writing the data slice to the target disk based on a correspondence between the deduplication index and all metadata corresponding to the deduplication index and based on a distribution location described in each piece of metadata corresponding to the deduplication index.

According to the method, the backup server determines, based on a correspondence that is between a deduplication index and metadata and that is in the metadata of the backup data, all metadata corresponding to each deduplication index. Then, after obtaining the data slice to which the deduplication index points and that is stored in the storage device, the backup server stores the data slice to the distribution location described in each piece of metadata corresponding to the deduplication index. For restoration of a plurality of data slices that have same data content and that correspond to a same deduplication index, the storage device is prevented from being frequently accessed to obtain, many times, the data slice to which the deduplication index points and that is stored in the storage device, a service life of the storage device is prolonged, communication load between the backup server and the storage device is reduced, and data restoration efficiency is improved.

With reference to the sixth aspect, in a first implementation, before the receiving a data restoration request by the backup server, the method further includes: slicing the backup data to obtain several data slices, and generating metadata of each data slice, where the several data slices include a first data slice; determining that data content of the first data slice is different from data content of all data slices that are in the backup data and that are backed up in the storage device, backing up the first data slice to the storage device, and creating a deduplication index for the first data slice backed up in the storage device, where all the data slices backed up in the storage device have different data content; storing a correspondence between the deduplication index of the first data slice backed up in the storage device and metadata of the first data slice; and storing a correspondence between the identifier of the backup data and the metadata of the backup data, where the metadata of the backup data includes the correspondence between the deduplication index of the first data slice backed up in the storage device and the metadata of the first data slice.

With reference to the sixth aspect, in a second implementation, before the receiving a data restoration request by the backup server, the method further includes: slicing the backup data into several data slices, and generating metadata of each data slice, where the several data slices include a second data slice; determining that data content of the second data slice is the same as data content of a third data slice that is in the backup data and that is backed up in the storage device, and storing a correspondence between a deduplication index of the third data slice and metadata of the second data slice; and storing a correspondence between the identifier of the backup data and the metadata of the backup data, where the metadata of the backup data includes the correspondence between the deduplication index of the third data slice and the metadata of the second data slice.

With reference to the sixth aspect or the first implementation or the second implementation of the sixth aspect, in a third implementation, the method includes: determining a quantity of pieces of all the metadata corresponding to the deduplication index; and storing a correspondence between the deduplication index and the quantity of pieces of all the metadata corresponding to the deduplication index.

According to a seventh aspect, a data restoration apparatus is provided, including various modules configured to perform the data restoration method according to any one of the sixth aspect or the possible implementations of the sixth aspect. The modules may be implemented by hardware, or may be implemented by executing corresponding software by hardware. The hardware or the software includes one or more modules corresponding to the foregoing functions.

According to an eighth aspect, a backup server is provided, including a memory and a processor, where the memory is configured to store a software program, and the processor runs the software program stored in the memory, to perform the method according to any one of the sixth aspect or the implementations of the sixth aspect.

According to a ninth aspect, a computer readable storage medium is provided. The computer readable storage medium stores an instruction. When the instruction is run on a backup server, the backup server is enabled to perform the method according to any one of the sixth aspect or the implementations of the sixth aspect.

According to a tenth aspect, a computer program product including an instruction is provided. When the computer program product is run on a backup server, the backup server is enabled to perform the method according to any one of the sixth aspect or the implementations of the sixth aspect.

BRIEF DESCRIPTION OF DRAWINGS

To describe technical solutions more clearly, the following briefly describes the accompanying drawings.

DESCRIPTION OF EMBODIMENTS

The technical solutions are clearly described in the following with reference to the accompanying drawings.

Figure 1:
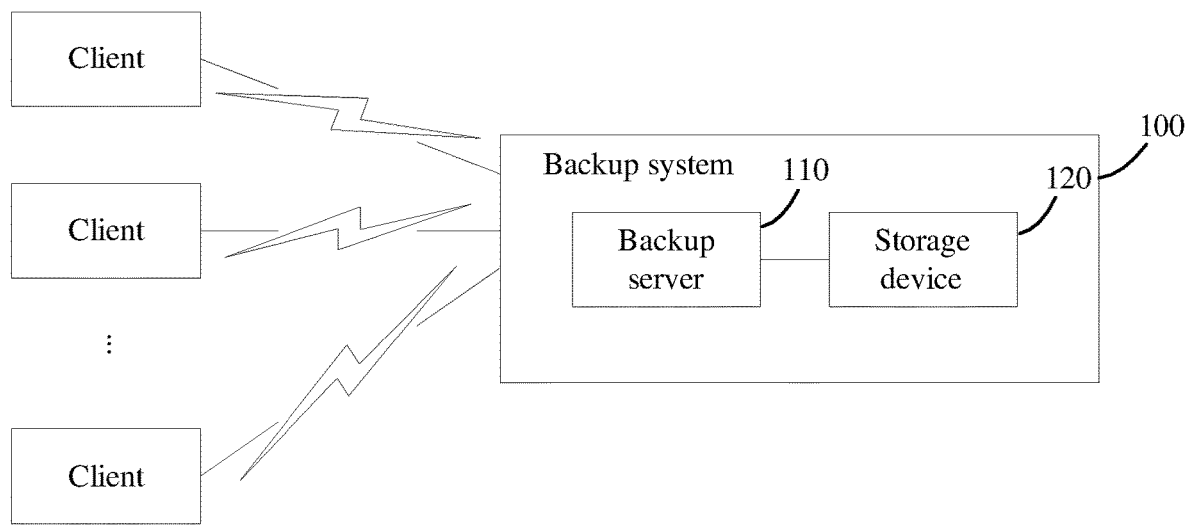
FIG. 1 is a schematic structural diagram of a backup system according to an embodiment.

FIG. 1 is a schematic structural diagram of a backup system 110 according to an embodiment. The backup system 100 includes a backup server 110 and a storage device 120. The backup server 110 is connected to the storage device 120. The storage device 120 and the backup server 110 may be integrated, or may be connected through a network.

A user communicates with the backup system 100 by using a client.

The client may be a physical server or a terminal device of any type. The terminal device in the embodiments includes a tablet computer, a notebook computer, a mobile internet device, a palmtop computer, a desktop computer, a mobile phone, or a terminal device in another product form.

The client may alternatively be a software module, for example, a software module running on a physical device or a virtual machine running on a physical server.

A data backup process is first described with reference to a structure of the backup system 100 shown in FIG. 1.

After receiving a request for backing up virtual machine disk data, the backup system 100 executes a backup program to back up the virtual machine disk data. When backing up the virtual machine disk data, the backup server 110 slices the received virtual machine disk data into a plurality of data slices, stores metadata of each data slice, and calculates a hash value of each data slice. The metadata of the data slice includes distribution information describing the data slice, and the distribution information is specifically used to describe a location at which the data slice is stored on a virtual machine disk.

Figure 2:
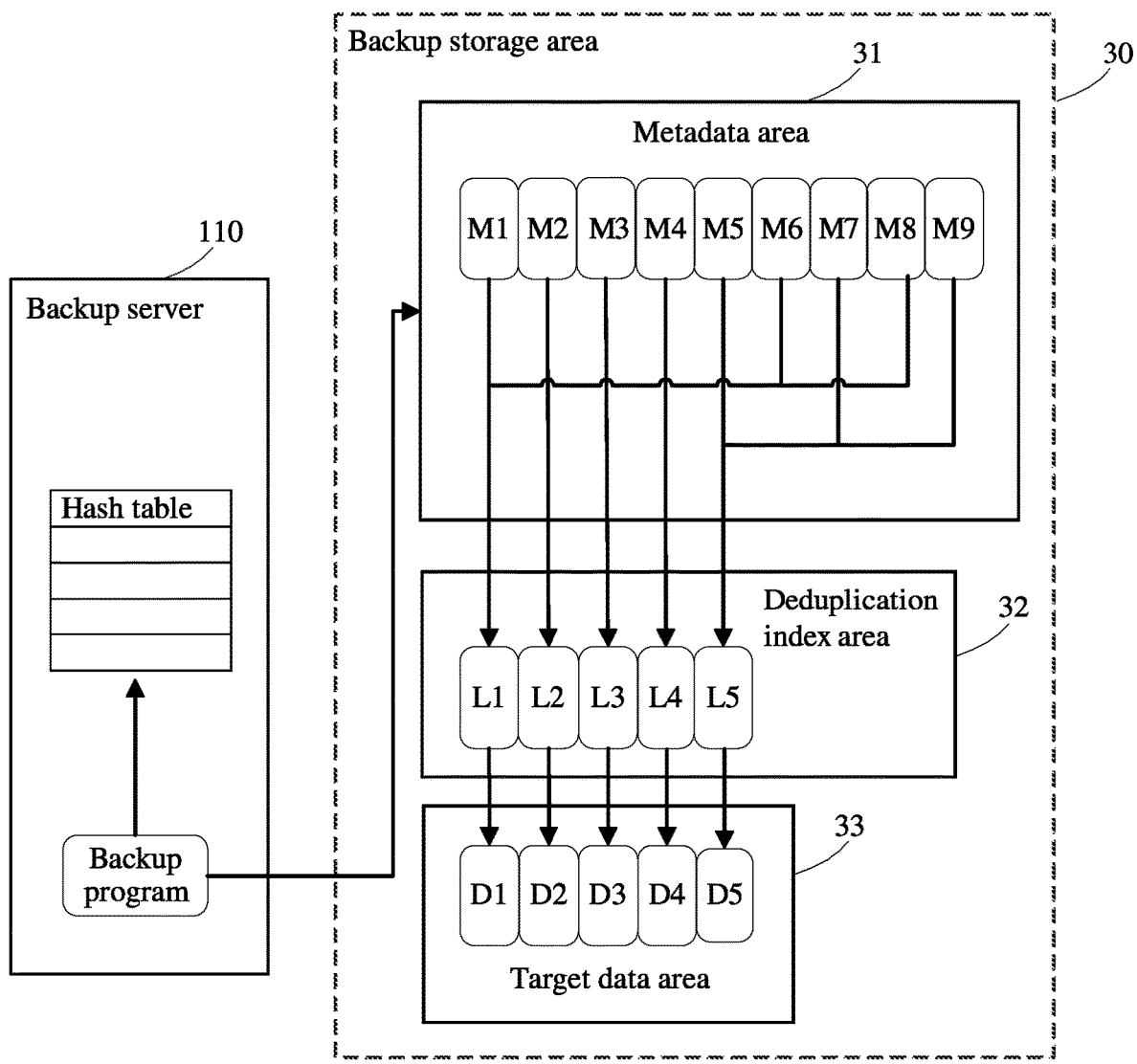
FIG. 2 is a schematic diagram of implementing data backup by using a deduplication technology according to an embodiment.

FIG. 2 is a schematic diagram of implementing data backup by using a deduplication technology according to an embodiment. In this embodiment, virtual machine disk data is used as an example of backup data for description. As shown in FIG. 2, a backup storage area 30 in a storage device 120 includes a metadata area 31, a deduplication index area 32, and a target data area 33. Specifically, a backup server 110 stores metadata of each data slice to the metadata area 21. In the example shown in FIG. 2, the metadata area 21 includes nine pieces of metadata: metadata M1 to metadata M9. The backup server 110 stores a virtual machine disk data identifier when backing up the virtual machine disk data. The backup server 110 stores a correspondence between the virtual machine disk data identifier and the metadata of each data slice in the virtual machine disk data to the backup server 110 or the storage device 120. The storage device 120 is configured to store the metadata of each data slice in the virtual machine disk data. In another implementation, the metadata of each data slice in the virtual machine disk data may be pre-stored on the backup server 110.

As shown in FIG. 2, the backup server 110 generates a hash table based on a hash value of each data slice. The hash table includes a hash value obtained by performing a hash operation on a data slice. Data slices having a same hash value include same data. Therefore, to reduce space occupied by duplicate data in the storage device 120, the backup server 110 stores only one of the data slices having the same hash value in a deduplication file. Specifically, the backup server 110 stores, in the storage device 120, only one data slice that is of the data slices having the same hash value and that is stored in the deduplication file.

For example, hash values of three data slices respectively corresponding to the metadata M1, metadata M6, and metadata M8 in the metadata area 21 shown in FIG. 2 are the same, hash values of three data slices respectively corresponding to metadata M5, metadata M7, and the metadata M9 are the same, and hash values of data slices corresponding to remaining pieces of metadata are different. Therefore, for the nine pieces of metadata, namely, the metadata M1 to the metadata M9, in the foregoing example, data slices backed up in the deduplication file include three data slices D2 to D4 having different hash values, and metadata of the three data slices D2 to D4 having different hash values is metadata M2, metadata M3, and metadata M4. In addition, the backup server 110 retains only one data slice for data slices having a same hash value. Therefore, the data slices backed up in the deduplication file further include a data slice corresponding to any one of the metadata M1, the metadata M6, and the metadata M8, for example, a data slice corresponding to the metadata M1. The data slices backed up in the deduplication file further include a data slice corresponding to any one of the metadata M5, the metadata M7, and the metadata M9, for example, a data slice D5 corresponding to the metadata M5. Therefore, in the example shown in FIG. 2, the data slices in the deduplication file are stored in the target data area 23. The target data area 23 is further used to back up data slices having different hash values in addition to one of data slices having a same hash value. For example, data slices that are stored in the storage device 120 and that are in the deduplication file shown in FIG. 2 include five data slices D1 to D5.

During data restoration, because all data slices having a same hash value have same data, there is a need to find only one data slice that is of all the data slices having the same hash value and that is backed up in the storage device 120, to restore all the data slices having the same hash value. Therefore, the backup server 110 can find, by using a deduplication index, the data slice backed up in the deduplication file. Data slices having a same hash value correspond to a same deduplication index, and data slices having different hash values correspond to different deduplication indexes. Specifically, when storing only one of the data slices having the same hash value in the deduplication file, the backup server 110 stores a correspondence between the same deduplication index and metadata of each of all the data slices having the same hash value, and stores a correspondence between the same deduplication index and the only one data slice that is of the data slices having the same hash value and that is stored in the deduplication file. A specific implementation of the deduplication index is a location at which the data slice stored in the deduplication file is stored in the storage device 120.

In the example shown in FIG. 2, each data slice in the deduplication file corresponds to a deduplication index of the data slice. To be specific, the deduplication index area 22 in the storage device 120 includes five deduplication indexes L1 to L5, and the five deduplication indexes L1 to L5 have a one-to-one correspondence with the five data slices D1 to D5 in the deduplication file.

When data restoration is performed based on the foregoing backup system 100 shown in FIG. 1, a common implementation is as follows: The backup server 110 sequentially searches for deduplication indexes in a storage order of data slices that needs to be restored; after each time a deduplication index is found, based on a correspondence between the deduplication index and only one data slice that is stored in the deduplication file and that is of data slices having a same hash value, the backup server 110 searches for the only one data slice that is stored in the deduplication file and that is of the data slices having the same hash value, to sequentially restore data in the data slices having the same hash value. Therefore, when restoring the virtual machine disk data, the backup server needs to obtain a same deduplication index many times, and access the storage device 120 many times to obtain the only one data slice that is stored in the deduplication file and that is of the data slices having the same hash value. Such frequent access to the storage device 120 increases communication load between the backup server and the storage device 120, reduces data restoration efficiency, and also shortens a service life of the storage device 120.

When the backup server 110 restores data, this embodiment provides an implementation different from the foregoing common implementation. In this implementation, the backup server 110 determines all metadata corresponding to each deduplication index. The backup server 110 determines, based on each piece of metadata, a distribution location that is of a data slice corresponding to each piece of metadata and that is in the virtual machine disk. After obtaining the data slice to which the deduplication index points and that is stored in the storage device 120, the backup server 110 stores the data slice to the distribution location described in each piece of metadata corresponding to the deduplication index. For restoration of a plurality of data slices that have a same hash value and that correspond to a same deduplication index, the storage device 120 is prevented from being frequently accessed to obtain, many times, the data slice to which the deduplication index points and that is stored in the storage device 120, a service life of the storage device 120 is prolonged, communication load between the backup server 110 and the storage device 120 is reduced, and data restoration efficiency is improved.

As shown in FIG. 1, in the backup system 100 provided in this embodiment, the backup server 110 is configured to restore data, and the backup server 110 restores virtual machine disk data after receiving a data restoration request sent by the client. The data restoration request includes a target disk identifier and a virtual machine disk data identifier, and the data restoration request is used to instruct to restore the virtual machine disk data to a target disk. The virtual machine disk data includes several data slices.

Specifically, the backup server 110 is configured to search for metadata of each data slice in the virtual machine disk data based on the virtual machine disk data identifier, where the metadata of the data slice is used to describe a distribution location of the data slice in the virtual machine disk data.

The backup server 110 is further configured to search for a deduplication index corresponding to the metadata of each data slice, where the deduplication index is used to indicate a data slice backed up in the storage device 120.

The storage device 120 is further configured to store the deduplication index. In another implementation, the deduplication index may be pre-stored on the backup server 110.

The backup server 110 is further configured to store a correspondence between the deduplication index and all metadata corresponding to the deduplication index.

The backup server 110 is further configured to search for the data slice to which the deduplication index points and that is located in the storage device 120.

The backup server 110 is further configured to write the data slice to the target disk based on the correspondence between the deduplication index and all the metadata corresponding to the deduplication index and based on a distribution location described in each piece of metadata corresponding to the deduplication index.

The backup server 110 in this embodiment may be a file server, or may be a physical computing device such as a computer or a desktop computer.

A structure of the backup server 110 in this embodiment is described below based on the structure of the backup system 100 shown in FIG. 1. The following describes the structure of the backup server 110 in this embodiment by using an example in which the backup server 110 and the storage device 120 are integrated.

Figure 3:
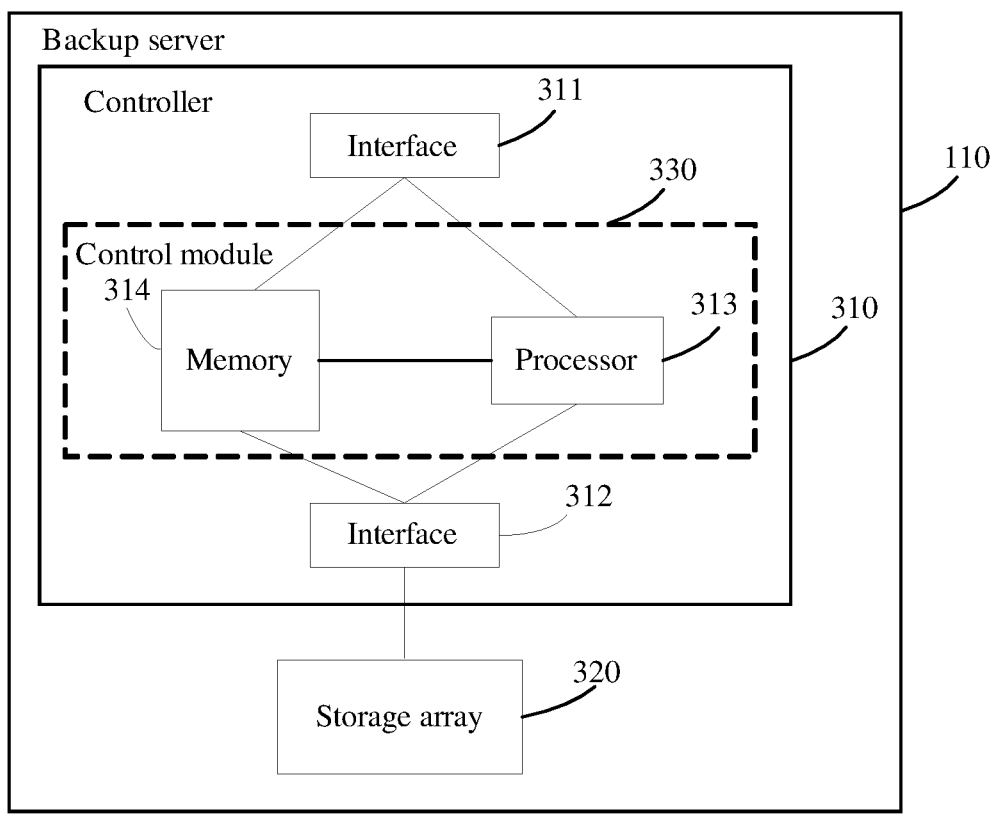
FIG. 3 is a schematic structural diagram of a backup server 110 according to an embodiment.

FIG. 3 is a schematic structural diagram of a backup server 110 according to an embodiment. As shown in FIG. 3, the backup server 110 includes a controller 310 and a storage array 320. The storage array 320 is equivalent to the storage device 120 shown in FIG. 1, is configured to store data that needs to be backed up in a backup process, for example, virtual machine disk data, and is further configured to store all data slices that are in the virtual machine disk data and that are backed up in a deduplication file.

Functions of components of the backup server 110 provided in this embodiment are described below based on a structure of the backup server 110 shown in FIG. 3.

In the backup server 110, the controller 310 is configured to: receive a data restoration request sent by a client, and restore virtual machine disk data. The data restoration request includes a target disk identifier and a virtual machine disk identifier, and the data restoration request is used to instruct to restore the virtual machine disk data to a target disk.

Specifically, the controller 310 is configured to search for metadata of each data slice in the virtual machine disk data based on the virtual machine disk identifier, where the metadata of the data slice is used to describe a distribution location of the data slice in the virtual machine disk data.

The storage array 320 is configured to store the metadata of each data slice in the virtual machine disk data. In another implementation, the metadata of each data slice in the virtual machine disk data may be pre-stored in the controller 310.

The controller 310 is further configured to search for a deduplication index corresponding to the metadata of each data slice, where the deduplication index is used to indicate a data slice backed up in the storage array 320.

The storage array 320 is further configured to store the deduplication index. In another implementation, the deduplication index may be pre-stored in the controller 310.

The controller 310 is further configured to store a correspondence between the deduplication index and all metadata corresponding to the deduplication index.

The controller 310 is further configured to search for the data slice to which the deduplication index points and that is located in the storage array 320.

The controller 310 is further configured to write the data slice to the target disk based on the correspondence between the deduplication index and all the metadata corresponding to the deduplication index and based on a distribution location described in each piece of metadata corresponding to the deduplication index.

In a conventional solution, when the client needs to restore all data slices having a same hash value, the controller 310 needs to search for, many times, a data slice to which a same deduplication index points and that is stored in the storage array 320, to access the storage array 320 many times. This increases communication load between the storage array 320 and the controller 310, and reduces data restoration efficiency. In addition, frequent access to the storage array 320 also shortens a service life of the storage array 320. In view of those disadvantages, this embodiment proposes the following solution for restoring all the data slices having the same hash value.

The controller 310 determines all metadata corresponding to each deduplication index. After obtaining, based on a distribution location of a data slice corresponding to each piece of metadata in the virtual machine disk, the data slice to which the deduplication index points and that is stored in the storage array 320, the controller 310 stores the data slice to the distribution location described in each piece of metadata corresponding to the deduplication index. For restoration of a plurality of data slices that have a same hash value and that correspond to a same deduplication index, the storage array 320 is prevented from being frequently accessed to obtain the data slice to which the deduplication index points and that is stored in the storage array 320, a service life of the storage array 320 is prolonged, communication load between the backup server 110 and the storage array 320 is reduced, and data restoration efficiency is improved.

As shown in FIG. 3, the controller 310 includes an interface 311 and an interface 312. The interface 311 is configured to communicate with the client. The interface 312 is configured to communicate with the storage array 320. The interface 311 is configured to receive the data restoration request sent by the client.

The controller 310 further includes a control module 330. The control module 330 is configured to restore the virtual machine disk data according to the data restoration request sent by the client and received by the interface 311.

Specifically, the control module 330 is configured to search for the metadata of each data slice in the virtual machine disk data based on the virtual machine disk identifier, where the metadata of the data slice is used to describe the distribution location of the data slice in the virtual machine disk data.

The control module 330 is further configured to search for the deduplication index corresponding to the metadata of each data slice.

The control module 330 is further configured to store the correspondence between the deduplication index and all the metadata corresponding to the deduplication index.

The control module 330 is further configured to search for, by using the interface 312, the data slice to which the deduplication index points and that is located in the storage array 320.

The control module 330 is further configured to write the data slice to the target disk based on the correspondence between the deduplication index and all the metadata corresponding to the deduplication index and based on the distribution location described in each piece of metadata corresponding to the deduplication index.

As shown in FIG. 3, the control module 330 includes a processor 313 and a memory 314. The processor 313 is configured to: receive the data restoration request sent by the client, and restore the virtual machine disk data.

Specifically, the processor 313 is configured to search for the metadata of each data slice in the virtual machine disk data based on the virtual machine disk identifier, where the metadata of the data slice is used to describe the distribution location of the data slice in the virtual machine disk data.

The processor 313 is further configured to search for the deduplication index corresponding to the metadata of each data slice.

The processor 313 is further configured to store the correspondence between the deduplication index and all the metadata corresponding to the deduplication index.

The processor 313 is further configured to search for, by using the interface 312, the data slice to which the deduplication index points and that is located in the storage array 320.

The processor 313 is further configured to write the data slice to the target disk based on the correspondence between the deduplication index and all the metadata corresponding to the deduplication index and based on the distribution location described in each piece of metadata corresponding to the deduplication index.

When the backup server 110 restores data, this embodiment further provides another implementation different from the foregoing common implementation. In another embodiment, the backup server 110 may create metadata of the backup data before restoring the backup data. The metadata of the backup data includes a correspondence between a same deduplication index corresponding to data slices having a same data content and metadata of each of all the data slices having the same data content, and a correspondence between different deduplication indexes corresponding to data slices having different data content and metadata of the data slices having different data content. In this way, when restoring the backup data, the backup server 110 determines, based on a correspondence that is between a deduplication index and metadata and that is in the metadata of the backup data, all metadata corresponding to each deduplication index. Then, after obtaining the data slice to which the deduplication index points and that is stored in the storage device 120, the backup server 110 stores the data slice to the distribution location described in each piece of metadata corresponding to the deduplication index. For restoration of a plurality of data slices that have same data content and that correspond to a same deduplication index, the storage device 120 is prevented from being frequently accessed to obtain, many times, the data slice to which the deduplication index points and that is stored in the storage device 120, a service life of the storage device 120 is prolonged, communication load between the backup server 110 and the storage device 120 is reduced, and data restoration efficiency is improved.

Compared with the foregoing implementation of restoring the backup data by determining, based on the deduplication index corresponding to the metadata of each data slice in the backup data, all the metadata corresponding to each deduplication index, in this embodiment, if the backup server 110 creates backup metadata before restoring the backup data, when restoring the backup data, the backup server 110 may directly determine, based on the backup metadata, all the metadata corresponding to each deduplication index. The following case is avoided: When the backup data is restored, corresponding several deduplication indexes are first determined based on different metadata, and then all the metadata corresponding to each deduplication index is determined, thereby simplifying a data restoration process.

Functions of components of another backup server 110 provided in an embodiment are described below based on the structure of the backup server 110 shown in FIG. 3.

In the backup server 110, a controller 310 is configured to: receive a data restoration request sent by a client, and restore virtual machine disk data. The data restoration request includes a target disk identifier and a virtual machine disk identifier, and the data restoration request is used to instruct to restore the virtual machine disk data to a target disk corresponding to the target disk identifier.

Specifically, the controller 310 is configured to search for metadata of the backup data based on the identifier of the backup data. The metadata of the backup data includes a deduplication index and metadata of each data slice included in the backup data, and the deduplication index is used to indicate a data slice backed up in a storage device 120. A same deduplication index corresponds to metadata of a plurality of data slices having same data content, and the metadata of the data slice is used to describe a distribution location of the data slice in the backup data.

A storage array 320 is configured to store the metadata of each data slice in the virtual machine disk data. In another implementation, the metadata of each data slice in the virtual machine disk data may be pre-stored in the controller 310.

The controller 310 is further configured to: search for each deduplication index in the metadata of the backup data, search for the data slice to which the deduplication index points and that is located in the storage device 120, and write the data slice to the target disk based on a correspondence between the deduplication index and all metadata corresponding to the deduplication index and based on a distribution location described in each piece of metadata corresponding to the deduplication index.

The storage array 320 is further configured to store the deduplication index. In another implementation, the deduplication index may be pre-stored in the controller 310.

In a conventional solution, when the client needs to restore all data slices having a same hash value, the controller 310 needs to search for, many times, a data slice to which a same deduplication index points and that is stored in the storage array 320, to access the storage array 320 many times. This increases communication load between the storage array 320 and the controller 310, and reduces data restoration efficiency. In addition, frequent access to the storage array 320 also shortens a service life of the storage array 320. In view of those disadvantages, this embodiment proposes the following solution for restoring all the data slices having the same hash value.

In this embodiment, before restoring the backup data, the controller 310 may create the metadata of the backup data. The metadata of the backup data includes a correspondence between a same deduplication index corresponding to data slices having same data content and metadata of each of all the data slices having the same data content, and a correspondence between different deduplication indexes corresponding to data slices having different data content and metadata of the data slices having different data content. In this way, when restoring the backup data, the controller 310 determines, based on a correspondence that is between a deduplication index and metadata and that is in the metadata of the backup data, all metadata corresponding to each deduplication index. After obtaining the data slice to which the deduplication index points and that is stored in the storage device 120, the controller 310 stores the data slice to the distribution location described in each piece of metadata corresponding to the deduplication index. For restoration of a plurality of data slices that have same data content and that correspond to a same deduplication index, the storage device 120 is prevented from being frequently accessed to obtain, many times, the data slice to which the deduplication index points and that is stored in the storage device 120, a service life of the storage device 120 is prolonged, communication load between the backup server 110 and the storage device 120 is reduced, and data restoration efficiency is improved.

Specifically, in the controller 310, a control module 330 is configured to search for the metadata of the backup data based on the identifier of the backup data. The metadata of the backup data includes the metadata of each data slice in the backup data and a deduplication index corresponding to the metadata of the data slice. The deduplication index is used to indicate the data slice backed up in the storage device 120. A same deduplication index corresponds to metadata of a plurality of data slices having same data content, and the metadata of the data slice is used to describe a distribution location of the data slice in the backup data.

The control module 330 is further configured to: search for each deduplication index in the metadata of the backup data, search for the data slice to which the deduplication index points and that is located in the storage device 120, and write the data slice to the target disk based on a correspondence between the deduplication index and all metadata corresponding to the deduplication index and based on a distribution location described in each piece of metadata corresponding to the deduplication index.

In the control module 330, specifically, a processor 313 is configured to search for the metadata of the backup data based on the identifier of the backup data. The metadata of the backup data includes the metadata of each data slice in the backup data and a deduplication index corresponding to the metadata of the data slice. The deduplication index is used to indicate the data slice backed up in the storage device 120. A same deduplication index corresponds to metadata of a plurality of data slices having same data content, and the metadata of the data slice is used to describe a distribution location of the data slice in the backup data.

The processor 313 is further configured to: search for each deduplication index in the metadata of the backup data, search for the data slice to which the deduplication index points and that is located in the storage device 120, and write the data slice to the target disk based on a correspondence between the deduplication index and all metadata corresponding to the deduplication index and based on a distribution location described in each piece of metadata corresponding to the deduplication index.

In the foregoing embodiment, the processor 313 may be any computing device such as a general-purpose central processing unit (CPU), a microprocessor, a programmable controller, an application-specific integrated circuit (ASIC), or one or more integrated circuits for controlling program execution in the foregoing solution. The processor 313 runs or executes a software program and/or an application module stored in a memory 314, and invokes data stored in the memory 314, to execute various functions of the backup server 110 and process data, so as to monitor the entire backup server 110. In a specific implementation, in an embodiment, the processor 313 may include one or more CPUs.

The memory 314 is configured to temporarily store information sent from the client. The memory 314 is further configured to store the software program and the application module. The processor 313 executes various function applications of the backup server 110 and processes data by running the software program and the application module that are stored in the memory 314.

The memory 314 mainly includes a program storage area and a data storage area. The program storage area may store an operating system and an application program used by at least one function, for example, sending a response message. The data storage area may store data to be processed by the application program. The memory 314 may include a volatile memory such as a random-access memory (RAM). The memory 314 may alternatively include a non-volatile memory, for example, a read-only memory (ROM), a flash memory, a hard disk drive (HDD), a solid-state drive (SSD), a disk storage medium or another storage device, or any other medium that can be used to carry or store desired program code in a form of an instruction or data structure and that can be accessed by a network device. However, this disclosure is not limited thereto.

The following describes a process of the data restoration method provided in the embodiments.

Figure 4:
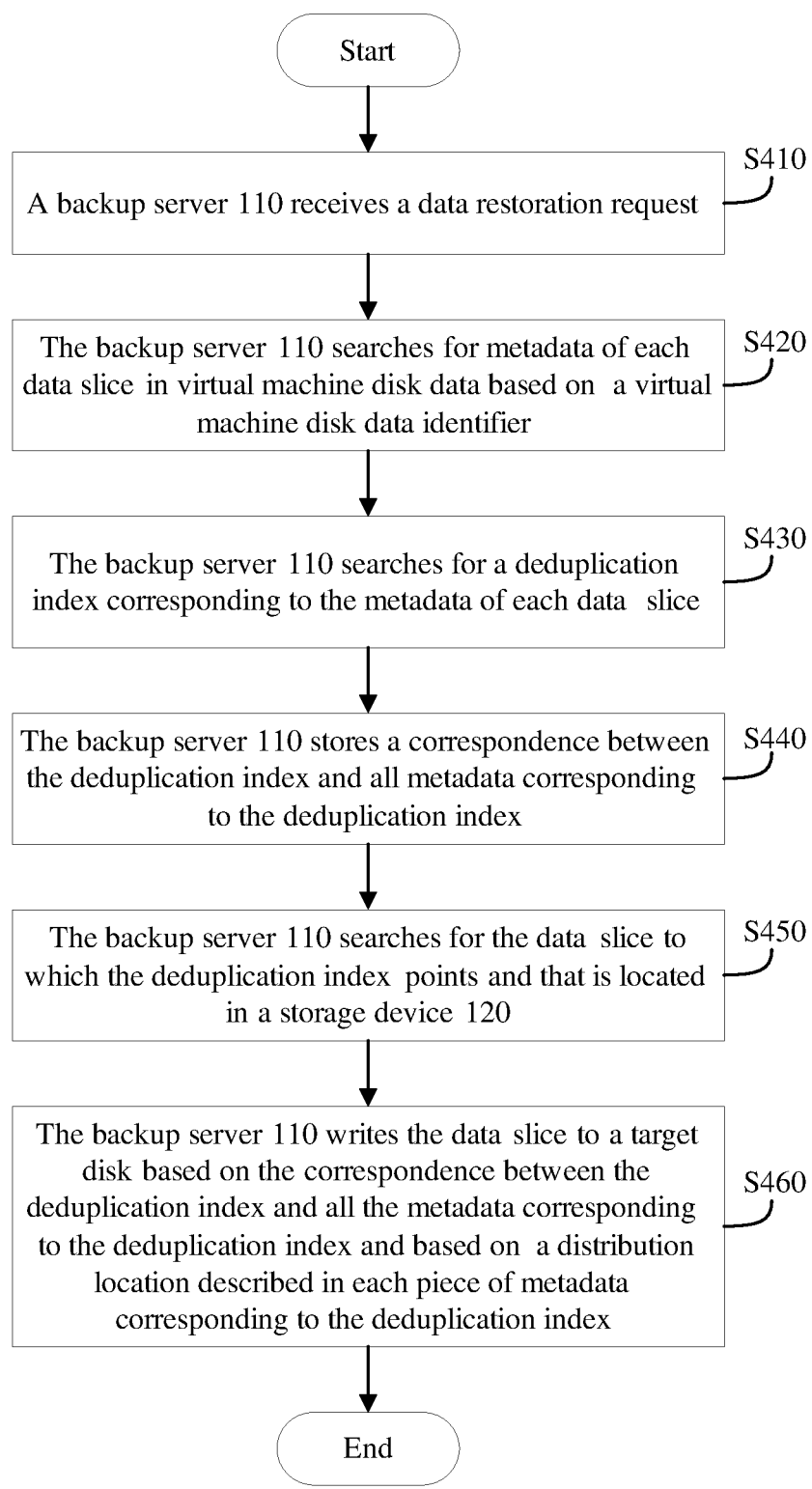
FIG. 4 is a flowchart of a data restoration method according to an embodiment.

FIG. 4 is a flowchart of a data restoration method according to an embodiment. As shown in FIG. 4, the data restoration method provided in this embodiment is performed by the backup server 110 shown in FIG. 1 or FIG. 3, and may be specifically performed by the control module 330 in the backup server 110 or the processor 313 in the control module 330 shown in FIG. 3. The following describes in detail a method of restoring virtual machine disk data after the virtual machine disk data is backed up to a storage device 120, and the method specifically includes the following steps.

S410: The backup server 110 receives a data restoration request.

The data restoration request includes a target disk identifier and a virtual machine disk data identifier, the data restoration request is used to instruct to restore the virtual machine disk data to a target disk, and the virtual machine disk data includes several data slices.

The target disk identifier may be, for example, "production data" or "business data," or may be a virtual machine disk identifier, or may be a letter, a number, or another symbol, or may be a combination of a letter, a number, or another symbol. In specific implementation, this embodiment imposes no limitation.

The target disk may be a virtual machine disk that is previously used to store the virtual machine disk data, or may be another disk. The target disk may be deployed in the storage device 120 or the backup server 110, or may be deployed in another physical device such as another storage device. The storage device may be a storage array.

S420: The backup server 110 searches for metadata of each data slice in the virtual machine disk data based on the virtual machine disk data identifier, where the virtual machine disk data identifier is an identifier of backup data stored when the backup server 110 previously performs backup.

The metadata of the data slice is used to describe a distribution location of the data slice in the virtual machine disk data. The metadata includes information describing the distribution location of the data slice in the virtual machine disk data, and the information describing the distribution location of the data slice in the virtual machine disk data includes an address at which the data slice is stored on the target disk.

If the metadata of each data slice in the target disk data is stored in the storage device 120, the backup server 110 pre-stores a correspondence between the target disk identifier and a start address of storage space of the storage device 120 for storing the metadata of all the data slices of the target disk data, or the backup server 110 pre-stores a correspondence between the target disk identifier and a metadata identifier of the metadata of each data slice in the target disk data. The backup server 110 sends a metadata obtaining request to the storage device 120, where the metadata obtaining request includes the metadata identifier or the start address of the storage space of the storage device 120 for storing the metadata of all the data slices of the target disk data. After receiving the metadata obtaining request, the storage device 120 searches for the metadata of each data slice in the target disk data based on the metadata identifier or the start address of the storage device 120 for storing the metadata of all the data slices of the target disk data.

S430: The backup server 110 searches for a deduplication index corresponding to the metadata of each data slice.

The deduplication index is used to indicate a data slice backed up in the storage device 120.

A specific implementation in which the backup server 110 searches for each deduplication index may be as follows: The backup server 110 queries a deduplication index table based on the target disk identifier, and the backup server 110 queries each deduplication index in the deduplication index table. The deduplication index table includes the metadata of all the data slices of the target disk data and a deduplication index corresponding to each data slice, and each deduplication index is used to indicate a data slice backed up in a deduplication file.

For example, the virtual machine disk data shown in FIG. 2 includes all data slices corresponding to metadata M1 to metadata M9. The metadata M1 to the metadata M9 are sequentially stored in the backup server 110 or the storage device 120. Content of the deduplication index table is, for example, shown in Table 1.

TABLE 1

| Deduplication index table | |
| --- | --- |
| Metadata | Deduplication index |
| M1 | L1 |
| M2 | L2 |
| M3 | L3 |
| M4 | L4 |
| M5 | L5 |
| M6 | L1 |
| M7 | L5 |
| M8 | L1 |
| M9 | L5 |

Another specific implementation in which the backup server 110 searches for each deduplication index may be as follows: The backup server 110 sequentially searches for the deduplication indexes corresponding to all the metadata in a storage order of the metadata. The storage order of the metadata is based on determined times of the data slices.

For example, the virtual machine disk data shown in FIG. 2 includes all data slices corresponding to metadata M1 to metadata M9. When the virtual machine disk data is sliced, the metadata M1 to the metadata M9 are sequentially stored in the backup server 110 or the storage device 120. After the backup server 110 first finds the metadata M1, the backup server 110 determines, based on a correspondence between the metadata M1 and a deduplication index L1, the deduplication index L1 of a data slice corresponding to the metadata M1. Subsequently, after the backup server 110 finds metadata M6, the backup server 110 determines that a deduplication index corresponding to the metadata M6 is also the deduplication index L1, based on a correspondence between the metadata M6 and the deduplication index L1. In this way, all the metadata is sequentially obtained in the storage order of the metadata, and metadata corresponding to a deduplication index is determined based on a correspondence between each piece of metadata and the deduplication index, until a deduplication index corresponding to the last metadata M9 is found.

Because metadata of all data slices having a same hash value corresponds to a same deduplication index, the backup server 110 or the storage device 120 stores a correspondence between metadata of all the data slices having the same hash value and the same deduplication index. This avoids storing a plurality of copies of the same deduplication index, and saves storage space. The saved storage space can be used to store other information or more deduplication indexes, and therefore utilization of the storage space is improved. For example, based on the virtual machine disk data shown in FIG. 2, the deduplication index table including the correspondence between the metadata of all the data slices having the same hash value and the same deduplication index may be shown in Table 2.

TABLE 2

Deduplication index table

| Metadata | Deduplication index |
| --- | --- |
| M1 | L1 |
| M6 | |
| M8 | |
| M2 | L2 |
| M3 | L3 |
| M4 | L4 |
| M5 | L5 |
| M7 | L1 |
| M9 | L5 |

There is a plurality of representations for the deduplication index.

For example, one representation of the deduplication index is an address at which the data slice backed up in the deduplication file is stored in the storage device 120. The address at which the data slice backed up in the deduplication file is stored in the storage device 120 is used to point to the data slice backed up in the deduplication file. Therefore, the data slice backed up in the deduplication file can be found by using the address at which the data slice backed up in the deduplication file is stored in the storage device 120 or the backup server 110.

Alternatively, another representation of the deduplication index is an identifier of the data slice backed up in the deduplication file, and the identifier of the data slice backed up in the deduplication file may be a character, a number, or a combination of a character and a number. Therefore, the data slice backed up in the deduplication file can be found by using the identifier of the data slice backed up in the deduplication file.

If the metadata of all the data slices having the same hash value corresponds to the same deduplication index, the same deduplication index corresponding to the metadata of all the data slices having the same hash value is the identifier of the data slice backed up in the deduplication file, or is the address at which the data slice backed up in the deduplication file is stored in the storage device 120 or the backup server 110.

S440: The backup server 110 stores a correspondence between the deduplication index and all metadata corresponding to the deduplication index.

When the backup server 110 stores the correspondence between the deduplication index and all the metadata corresponding to the deduplication index, the backup server 110 specifically stores a correspondence between the deduplication index and the distribution location described in each piece of metadata corresponding to the deduplication index.

After the foregoing step S420, that is, after the backup server 110 obtains the metadata of each data slice in the target disk data, because the metadata of each data slice is used to describe the distribution location of the data slice in the target disk, the backup server 110 may determine, based on each piece of metadata, the distribution location of the data slice corresponding to each piece of metadata, so that the backup server 110 can store, in step S440, the correspondence between the deduplication index and the distribution location described in each piece of metadata corresponding to the deduplication index.

The backup server 110 stores the correspondence between the deduplication index and the distribution location described in each piece of metadata corresponding to the deduplication index, so that after the distribution location of the data slice is found, a case in which the data slice cannot be effectively restored after information describing the distribution location of the data slice is lost due to a storage system failure is avoided, and data restoration stability is further improved.

The virtual machine disk data shown in FIG. 2 includes all the data slices corresponding to the metadata M1 to the metadata M9. The metadata M1 to the metadata M9 are sequentially stored in the backup server 110 or the storage device 120. According to the foregoing step S430, the backup server 110 finds the metadata M1. After determining, based on the correspondence between the metadata M1 and the deduplication index L1, the deduplication index L1 of the data corresponding to the metadata M1, in step S440, the backup server 110 stores the correspondence between the deduplication index L1 and the metadata M1. For example, as shown in Table 3, the backup server 110 stores the correspondence between the deduplication index L1 and the metadata M1 to the restoration index table.

TABLE 3

Restoration index table

| Deduplication index | Metadata |
| --- | --- |
| L1 | M1 |

The backup server 110 subsequently finds the metadata M6 based on the foregoing step S430. After determining, based on the correspondence between the metadata M6 and the deduplication index L1, that the deduplication index corresponding to the metadata M6 is also the deduplication index L1, in step S440, the backup server 110 stores the correspondence between the deduplication index L1 and the metadata M6, for example, as shown in Table 4.

TABLE 4

Restoration index table

| Deduplication index | Metadata |
| --- | --- |
| L1 | M1 |
| | M6 |

In this way, based on the description of the foregoing step S430, after the backup server 110 sequentially obtains each piece of metadata in a storage order of the metadata M1 to the metadata M9, and determines, based on a correspondence between each piece of metadata and a deduplication index, all metadata corresponding to the deduplication index, in step S440, the backup server 110 stores a correspondence between the deduplication index and all the metadata corresponding to the deduplication index, until a correspondence between each deduplication index and all metadata corresponding to each deduplication index is determined and stored, for example, as shown in Table 5.

TABLE 5

Restoration index table

| Deduplication index | Metadata |
|---|---|
| L1 | M1 |
|  | M6 |
|  | M8 |
| L2 | M2 |
| L3 | M3 |
| L4 | M4 |
| L5 | M5 |
|  | M7 |
|  | M9 |

S450: The backup server 110 searches for the data slice to which the deduplication index points and that is located in the storage device 120. It should be noted that no execution order is specified between step S450 and the foregoing step S440.

The backup server 110 sends a data slice obtaining request to the storage device 120. The data slice obtaining request includes the deduplication index.

When the deduplication index is the address at which the data slice in the deduplication file is stored in the storage device 120, the storage device 120 directly obtains, based on the deduplication index, the data slice to which the deduplication index points. When the deduplication index is the address at which the data slice in the deduplication file is stored in the storage device 120, the deduplication index may be directly used to index the data slice in the deduplication file. This avoids occupying additional storage space to store a correspondence between the deduplication index and the address at which the data slice in the deduplication file is stored in the storage device 120, and saves storage space.

When the deduplication index is the identifier of the data slice backed up in the deduplication file, the storage device 120 pre-stores a mapping relationship between the identifier of the data slice backed up in the deduplication file and the address at which the data slice in the deduplication file is stored in the storage device 120. After receiving the data slice obtaining request, the storage device 120 searches for the address at which the data slice in the deduplication file is stored in the storage device 120, based on the mapping relationship that is pre-stored in the storage device 120 and that is between the identifier of the data slice backed up in the deduplication file and the address at which the data slice in the deduplication file is stored in the storage device 120, obtains the data slice based on the address at which the data slice in the deduplication file is stored in the storage device 120, and returns the data slice to the backup server 110.

After obtaining the identifier of the data slice backed up in the deduplication file, the storage device 120 searches for a correspondence between the identifier of the data slice backed up in the deduplication file and the address at which the data slice backed up in the deduplication file is stored in the storage device 120 or the backup server 110, searches for the data slice backed up in the deduplication file, and returns the data slice to the backup server 110.

S460: The backup server 110 writes the data slice to the target disk based on a correspondence between the deduplication index and all the metadata corresponding to the deduplication index and based on the distribution location described in each piece of metadata corresponding to the deduplication index.

Specifically, after the backup server 110 writes the data slice to a plurality of locations in the target disk based on the distribution location described in each piece of metadata corresponding to the deduplication index, distribution locations that are of data slices stored in the target disk and having a same hash value and that are in the target disk are the same as distribution locations described in metadata of the data slices having the same hash value.

The backup server 110 sends a data restoration response to a management device that manages the target disk. The management device may be a storage device or a storage array. The data restoration response includes the data slice to which the deduplication index points and that is located in the storage device 120, and includes the distribution location described in each piece of metadata corresponding to the deduplication index. After receiving the data restoration response, the management device writes the data slice to the distribution location described in each piece of metadata corresponding to the deduplication index.

Based on the data restoration method shown in FIG. 4, after step S420, that is, after the backup server 110 searches for the metadata of each data slice in the virtual machine disk data based on the virtual machine disk data identifier, the backup server 110 determines a quantity of pieces of all found metadata. In addition, based on the foregoing step S430, after the backup server 110 finds the deduplication index corresponding to the metadata of the data slice, the backup server 110 stores a correspondence between the deduplication index and the quantity of pieces of all the metadata corresponding to the deduplication index.

For example, as shown in Table 6, the backup server 110 stores the correspondence, between the deduplication index and the quantity of pieces of all the metadata corresponding to the deduplication index, into the restoration index table.

TABLE 6

Restoration index table

| Deduplication index | Metadata | A quantity of pieces of metadata |
|---|---|---|
| L1 | M1 | 3 |
|  | M6 |  |
|  | M8 |  |
| L2 | M2 | 1 |
| L3 | M3 | 1 |
| L4 | M4 | 1 |
| L5 | M5 | 3 |
|  | M7 |  |
|  | M9 |  |

In the restoration index table shown in Table 6, the deduplication index includes an index offset, and the index offset indicates an offset location at which the deduplication index is stored in the deduplication index table. The metadata includes a disk offset, and the disk offset indicates a distribution location of a data slice corresponding to each piece of metadata to be stored on the target disk.

The backup server 110 stores the correspondence between the deduplication index and the quantity of pieces of all the metadata corresponding to the deduplication index, to subsequently monitor whether all the data slices in the target disk data are fully restored. For example, the backup server 110 may query whether a quantity of restored data slices having a same hash value is the same as the quantity of pieces of the metadata. If the quantities are the same, it indicates that the data slices having the same hash value in the target disk data are fully restored. If the quantities are different, the backup server 110 queries metadata of an unrestored data slice, and then obtains a deduplication index based on a correspondence between the metadata and the deduplication index, and re-obtains the data slice in the deduplication file based on the deduplication index. Then, the backup server 110 stores, based on the metadata of the data slice, the data slice re-obtained based on the deduplication index in the distribution location described in the metadata, to complete restoration of the unrestored data slice. The backup server 110 stores the correspondence between the deduplication index and the quantity of pieces of all the metadata corresponding to the deduplication index, to monitor whether restoration of all the data slices in the target disk data is completed. This improves data restoration accuracy and reduces a rate of loss of a data slice during data restoration.

Figure 5:
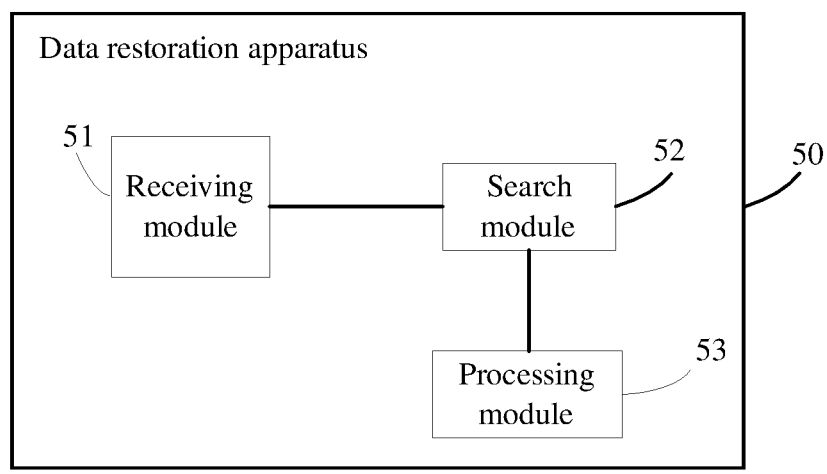
FIG. 5 is a structural diagram of a data restoration apparatus according to an embodiment.

FIG. 5 is a structural diagram of a data restoration apparatus according to an embodiment. As shown in FIG. 5, a data restoration apparatus 50 provided in this embodiment may be deployed in a backup server 110, and is further configured to perform the data restoration method shown in FIG. 4. Specifically, the data restoration apparatus 50 includes a receiving module 51, a search module 52, and a processing module 53. The receiving module 51 is connected to the search module 52, and the search module 52 is connected to the processing module 53. Functions of the modules in the data restoration apparatus 50 are described below.

In this embodiment, the receiving module 51 is configured to receive a data restoration request. The data restoration request includes a target disk identifier and an identifier of backup data, the data restoration request is used to instruct to restore the backup data to a target disk, and the backup data includes several data slices.

In this implementation, a function of receiving a data restoration request by the receiving module 51 may be implemented by using an interface 311 in the backup server 110. For specific implementation details, refer to the specific details of step S410 shown in FIG. 4. Details are not described herein again.

In this embodiment, the search module 52 is configured to: search for metadata of each data slice in the backup data based on the identifier of the backup data; search for a deduplication index corresponding to the metadata of each data slice; and search for the data slice to which the deduplication index points and that is located in a storage device. The metadata of the data slice is used to describe a distribution location of the data slice in the backup data. The deduplication index is used to indicate the data slice backed up in the storage device. Metadata of a plurality of data slices having same data content corresponds to a same deduplication index.

In this implementation, a function of searching for metadata of each data slice in the backup data by the search module 52 based on the identifier of the backup data may be implemented by a control module 330 or a processor 313 in the backup server 110. For specific implementation details of searching for the metadata of each data slice in the backup data by the search module 52 based on the identifier of the backup data, refer to the specific details of step S420 shown in FIG. 4. Details are not described herein again.

In this implementation, a function of searching for a deduplication index corresponding to the metadata of each data slice by the search module 52 may be implemented by the control module 330 or the processor 313 in the backup server 110. For specific implementation details of searching for the deduplication index corresponding to the metadata of each data slice by the search module 52, refer to the specific details of step S430 shown in FIG. 4. Details are not described herein again.

In this implementation, a function of searching, by the search module 52, for the data slice to which the deduplication index points and that is located in the storage device may be implemented by the control module 330 or the processor 313 in the backup server 110. For specific implementation details of searching, by the search module 52, for the data slice to which the deduplication index points and that is located in the storage device, refer to the specific details of step S450 shown in FIG. 4. Details are not described herein again.

In this embodiment, the processing module 53 is configured to write the data slice to the target disk based on a correspondence between the deduplication index and all metadata corresponding to the deduplication index and based on a distribution location described in each piece of metadata corresponding to the deduplication index.

In this implementation, a function of writing, by the processing module 53, the data slice to the target disk based on a correspondence between the deduplication index and all metadata corresponding to the deduplication index and based on a distribution location described in each piece of metadata corresponding to the deduplication index may be implemented by the control module 330 or the processor 313 in the backup server 110. For specific implementation details of writing, by the processing module 53, the data slice to the target disk based on the correspondence between the deduplication index and all the metadata corresponding to the deduplication index and based on the distribution location described in each piece of metadata corresponding to the deduplication index, refer to the specific details of step S460 shown in FIG. 4. Details are not described herein again.

Optionally, in this embodiment, the processing module 53 is further configured to store a correspondence between the deduplication index and the distribution location described in each piece of metadata corresponding to the deduplication index.

In this implementation, a function of storing, by the processing module 53, a correspondence between the deduplication index and the distribution location described in each piece of metadata corresponding to the deduplication index may be implemented by the control module 330 or the processor 313 in the backup server 110. For specific implementation details of storing, by the processing module 53, the correspondence between the deduplication index and the distribution location described in each piece of metadata corresponding to the deduplication index, refer to the specific details of step S440 shown in FIG. 4. Details are not described herein again.

Optionally, in this embodiment, the search module 52 is further configured to: query a deduplication index table based on the identifier of the backup data, and query each deduplication index in the deduplication index table.

In this implementation, a function of querying, by the search module 52, a deduplication index table based on the identifier of the backup data and querying each deduplication index in the deduplication index table may be implemented by the control module 330 or the processor 313 in the backup server 110. For specific implementation details of querying, by the search module 52, the deduplication index table based on the identifier of the backup data and querying each deduplication index in the deduplication index table, refer to the specific details, of querying the deduplication index table based on the identifier of the backup data, described in step S430 shown in FIG. 4. Details are not described herein again.

Optionally, in this embodiment, the search module 52 is further configured to determine a quantity of pieces of all the metadata corresponding to the deduplication index.

In this implementation, a function of determining, by the search module 52, a quantity of pieces of all the metadata corresponding to the deduplication index may be implemented by the control module 330 or the processor 313 in the backup server 110. For specific implementation details of determining, by the search module 52, the quantity of pieces of all the metadata corresponding to the deduplication index, refer to the specific details, of how to determine the quantity of pieces of all the metadata corresponding to the deduplication index, described after step S460 shown in FIG. 4. Details are not described herein again.

In this embodiment, the processing module 53 is further configured to store a correspondence between the deduplication index and the quantity of pieces of all the metadata corresponding to the deduplication index.

In this implementation, a function of storing, by the processing module 53, a correspondence between the deduplication index and the quantity of pieces of all the metadata corresponding to the deduplication index may be implemented by the control module 330 or the processor 313 in the backup server 110. For specific implementation details of storing, by the processing module 53, the correspondence between the deduplication index and the quantity of pieces of all the metadata corresponding to the deduplication index, refer to the specific implementation details, of how to store the correspondence between the deduplication index and the quantity of pieces of all the metadata corresponding to the deduplication index, described after step S460 shown in FIG. 4. Details are not described herein again.

According to the data restoration method shown in FIG. 4 and the data restoration apparatus shown in FIG. 5, after receiving the data restoration request, the backup server or the data restoration apparatus determines, based on the deduplication index corresponding to the metadata of each data slice in the backup data, all the metadata corresponding to each deduplication index; and after obtaining the data slice to which the deduplication index points and that is stored in the storage device, stores the data slice to the distribution location described in each piece of metadata corresponding to the deduplication index. For restoration of a plurality of data slices that have same data content and that correspond to a same deduplication index, the storage device is prevented from being frequently accessed to obtain, many times, the data slice to which the deduplication index points and that is stored in the storage device, a service life of the storage device is prolonged, communication load between the backup server and the storage device is reduced, and data restoration efficiency is improved.

Figure 6:
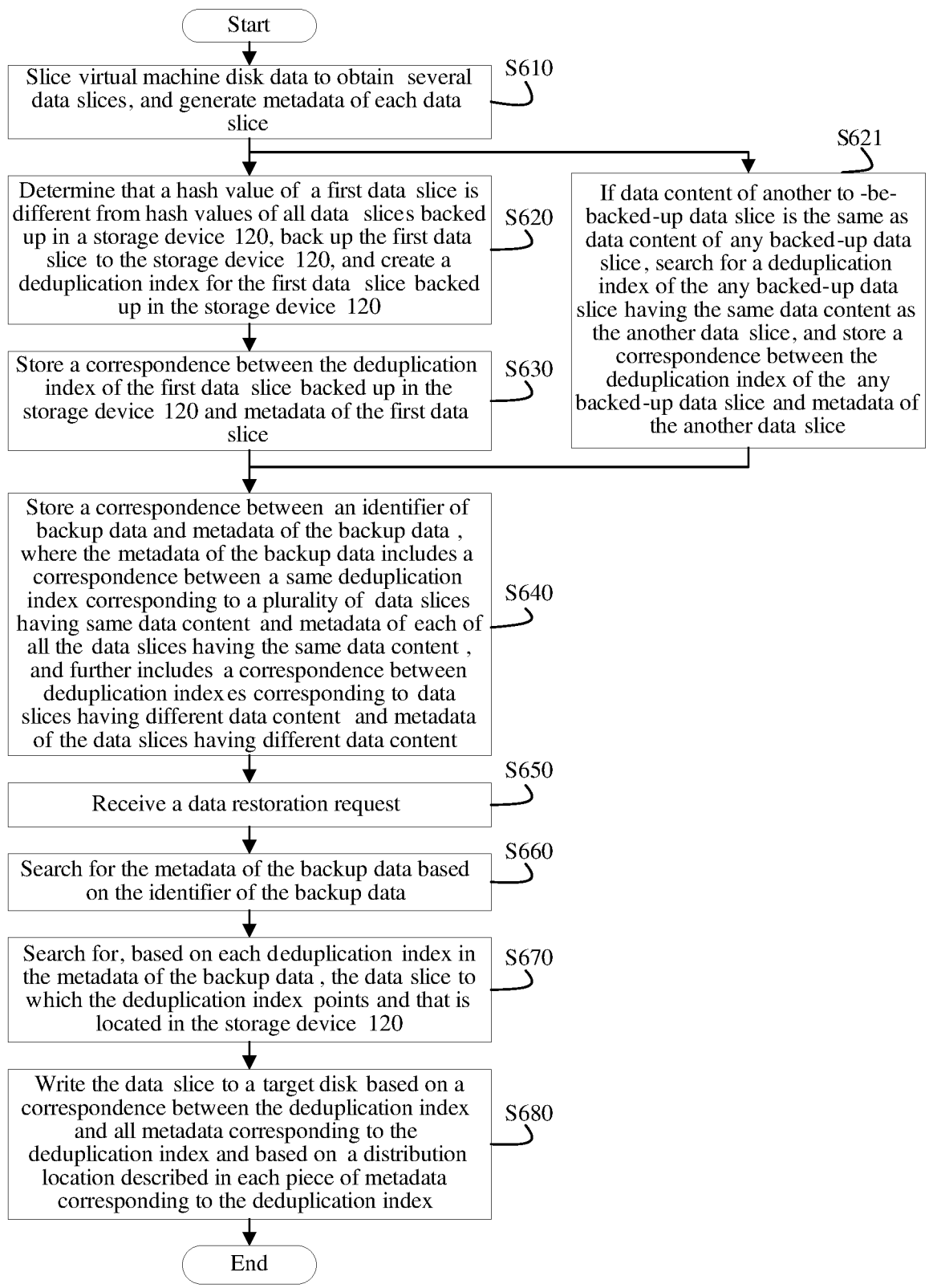
FIG. 6 is a flowchart of another data restoration method according to an embodiment.

FIG. 6 is a flowchart of a data restoration method according to an embodiment. As shown in FIG. 6, the data restoration method provided in this embodiment is performed by the backup server 110 shown in FIG. 1 or FIG. 3, and may be specifically performed by the control module 330 in the backup server 110 or the processor 313 in the control module 330 shown in FIG. 3. The following describes in detail a method of obtaining metadata of backup data when virtual machine disk data is backed up to a storage device 120 and restoring the virtual machine disk data after the metadata of the backup data is obtained, and the method specifically includes the following steps.

S610: Slice the virtual machine disk data to obtain several data slices, and generate metadata of each data slice, where the several data slices include a first data slice and a second data slice.

After step S610, that the backup server 110 obtains metadata of the backup data includes the following: The backup server 110 may determine, based on a hash value of a data slice, a plurality of data slices having same data content in the virtual machine disk data, and a plurality of data slices having different data content in the virtual machine disk data. Data content of the plurality of data slices having the same hash value is the same. For the plurality of data slices having the same data content, the backup server 110 backs up only one data slice to the storage device 120. For the plurality of data slices having different data content, the backup server 110 backs up each data slice to the storage device 120. After backing up the data slice to the storage device 120, the backup server 110 creates a deduplication index for each backed-up data slice. The deduplication index is used to indicate the data slice backed up in the storage device 120. For the plurality of data slices having the same data content, after creating the deduplication index, the backup server 110 stores a correspondence between the deduplication index and metadata of the plurality of data slices having the same data content. For the plurality of data slices having different data content, after creating deduplication indexes respectively corresponding to the data slices backed up in the storage device 120, the backup server 110 stores a correspondence between the deduplication indexes and metadata of the data slices backed up in the storage device 120. In this way, the metadata of the backup data includes a correspondence between a same deduplication index corresponding to a plurality of data slices having same data content and metadata of each of all the data slices having the same data content, and further includes a correspondence between deduplication indexes corresponding to data slices having different data content and metadata of the data slices having different data content.

After the backup server 110 receives the virtual machine disk data, a specific implementation of obtaining the metadata of the backup data includes the following: The backup server 110 slices the virtual machine disk data, and backs up a start data slice in the virtual machine disk data to the storage device 120. When determining the plurality of data slices having the same data content, the backup server 110 sequentially determines, based on distribution locations of the data slices of the virtual machine disk data in the virtual machine disk data, whether data content of another data slice, following the start data slice, to be backed up to the storage device 120 is the same as that of any data slice backed up in the storage device 120. If the data content of the two data slices is different, for a specific process of obtaining information included in the metadata of the backup data, refer to details of the following steps S620 and S630. If the data content of the two data slices is the same, for a specific process of obtaining information included in the metadata of the backup data, refer to details of the following step S621.

S620: Determine that a hash value of the first data slice is different from hash values of all data slices backed up in the storage device 120, back up the first data slice to the storage device 120, and create a deduplication index for the first data slice backed up in the storage device 120.

For example, the data slices that are backed up in the storage device 120 and that are in the virtual machine disk data include only the start data slice. When another data slice (for example, the first data slice) in the virtual machine disk data is backed up, whether a hash value of the another data slice is the same as a hash value of each of the data slices backed up in the storage device 120 is determined first. If the hash values are different, the another data slice is backed up to the storage device 120, and a deduplication index is created for the another data slice in the storage device 120. The deduplication index of the another data slice indicates the another data slice backed up in the storage device 120. In this way, several data slices that are backed up in the storage device 120 and that are in the backup data are data slices having different hash values, the several data slices backed up in the storage device 120 respectively correspond to different deduplication indexes, the deduplication indexes indicate the data slices that correspond to the deduplication indexes and that are backed up in the storage device 120, and the data slices backed up in the storage device 120 can be found based on the deduplication indexes.

The first data slice is contiguous to the start data slice in the virtual machine disk data, or is at an interval with the start data slice.

If the first data slice is contiguous to the start data slice in the virtual machine disk data, the first data slice is the second-data-slice of the virtual machine disk data. If the first data slice is at an interval with the start data slice in the virtual machine disk data, the first data slice is any data slice following the second-data-slice of the virtual machine disk data.

S630: Store a correspondence between the deduplication index of the first data slice backed up in the storage device 120 and metadata of the first data slice.

In the foregoing embodiment, steps S620 and S630 describe a first implementation of how to obtain the information included in the metadata of the backup data when the content of the another to-be-backed-up data slice is different from the data content of all the backed-up data slices. That is, after determining that the content of the another to-be-backed-up data slice is different from the data content of all the backed-up data slices in step S620, in step S620, the another data slice having different content from the backed-up data slices is backed up to the storage device 120, and the deduplication index of the another data slice having different content from the backed-up data slices is created. Then, in step S630, a correspondence between the deduplication index of the another data slice having different content from the backed-up data slices and metadata of the another data slice having different content from the backed-up data slices is stored. In this way, the information included in the metadata of the backup data includes a one-to-one correspondence between deduplication indexes of the data slices that have different data content and that are backed up in the storage device 120 and metadata of the data slices having different data content.

In another implementation, if the data content of the another to-be-backed-up data slice (for example, the second data slice) is the same as data content of a backed-up third data slice, a second implementation of how to obtain the information included in the metadata of the backup data includes step S621: search for a deduplication index of the backed-up third data slice having the same data content as the another data slice, and store a correspondence between the deduplication index of the backed-up third data slice having the same data content as the another data slice and the metadata of the another data slice. In this way, the information included in the metadata of the backup data includes a correspondence between a same deduplication index corresponding to all data slices having same data content and metadata of each of all the data slices having the same data content. In this implementation, the content of the another to-be-backed-up data slice is the same as the content of all the backed-up data slices. To save storage space of the storage device 120, the backup server 110 stores the same deduplication index corresponding to all the data slices having the same data content, and therefore does not need to back up the another data slice having the same data content as the backed-up third data slice in the backup data, and may subsequently restore the data slices, having the same data content, based on the data slices that are indicated by the same deduplication index in the metadata of the backup data and that are backed up in the storage device 120.

Data content of some or all of all data slices in the virtual machine disk data may be the same or different. According to a case in which the data content of the data slices in the virtual machine disk data is the same or different, when the information included in the metadata of the backup data is obtained, only one of the foregoing two manners of obtaining the information included in the metadata of the backup data may be used to obtain the metadata of the backup data, or both the foregoing two manners of obtaining the information included in the metadata of the backup data may be used to obtain the metadata of the backup data. The following describes a process of obtaining the metadata of the backup data according to the case in which the data content of the data slices in the virtual machine disk data is the same or different.

If the data content of all the data slices in the virtual machine disk data is different, only the first implementation of obtaining the information included in the metadata of the backup data according to the foregoing steps S620 and S630 may be required to obtain the information included in the metadata of the backup data. The information included in the metadata of the backup data includes the deduplication index of each data slice in the virtual machine disk data and the metadata corresponding to the deduplication index of the data slice. In this case, the information included in the metadata of the backup data does not have the same deduplication index corresponding to the metadata of the plurality of data slices having the same data content.

If data content of at least some of all the data slices in the virtual machine disk data is the same, the foregoing two manners of obtaining the information included in the metadata of the backup data are used to obtain the metadata of the backup data. The information, included in the metadata of the backup data, obtained according to the second implementation of obtaining the information included in the metadata of the backup data includes the same deduplication index corresponding to the plurality of data slices having the same data content in the virtual machine disk data and the metadata of each of all the data slices that have the same data content and that correspond to the same deduplication index. In addition, the information, included in the metadata of the backup data, obtained according to the first implementation of obtaining the information included in the metadata of the backup data includes the deduplication indexes corresponding to the plurality of data slices having different data content and the metadata of each of the plurality of data slices having different data content. In this way, the finally obtained information included in the metadata of the backup data includes not only the same deduplication index corresponding to the plurality of data slices having the same data content, but also includes the deduplication indexes corresponding to the plurality of data slices having different data content.

In an extreme case, if the data content of all the data slices in the virtual machine disk data is the same, the information, included in the metadata of the backup data, obtained according to the second implementation of obtaining the information included in the metadata of the backup data includes the same deduplication index corresponding to the plurality of data slices having the same data content in the virtual machine disk data and the metadata of each of all the data slices that have the same data content and that correspond to the same deduplication index. All the data slices in the virtual machine disk data have the same data content, and therefore only one data slice needs to be backed up to the storage device 120. Therefore, there is only one deduplication index in the information included in the metadata of the backup data, and the deduplication index indicates the data slice backed up in the storage device 120.

After the metadata of the backup data is obtained, the following step S640 is performed.

S640: Store a correspondence between an identifier of the backup data and the metadata of the backup data, where the metadata of the backup data includes the correspondence between the deduplication index of the first data slice backed up in the storage device 120 and the metadata of the first data slice. After obtaining the virtual machine disk data, the backup server 110 may create the identifier of the backup data. The identifier of the backup data may be a virtual machine disk identifier or another character.

S650: Receive a data restoration request, where the data restoration request includes a target disk identifier and the identifier of the backup data, and the data restoration request is used to instruct to restore the backup data to a target disk corresponding to the target disk identifier.

S660: Search for the metadata of the backup data based on the identifier of the backup data.

The information included in the metadata of the backup data includes the deduplication index of each data slice that is in the virtual machine disk data and that is backed up in the storage device 120 and the metadata corresponding to the deduplication index. The deduplication index is used to indicate the data slice backed up in the storage device 120. A same deduplication index corresponds to metadata of a plurality of data slices that have same data content and that are in the virtual machine disk data. The metadata of the data slice is used to describe a distribution location of the data slice in the virtual machine disk data. For a manner of obtaining the information included in the metadata of the backup data, refer to the details of the foregoing steps S620 and S630 or the details of step S621.

S670: Search for the data slice to which the deduplication index points and that is located in the storage device 120.

S680: Write the data slice to the target disk based on a correspondence between the deduplication index and all metadata corresponding to the deduplication index and based on a distribution location described in each piece of metadata corresponding to the deduplication index.

In the implementation shown in FIG. 6, the backup server 110 may determine a quantity of pieces of all metadata corresponding to the deduplication index, and store a correspondence between the deduplication index and the quantity of pieces of all the metadata corresponding to the deduplication index.

Figure 7:
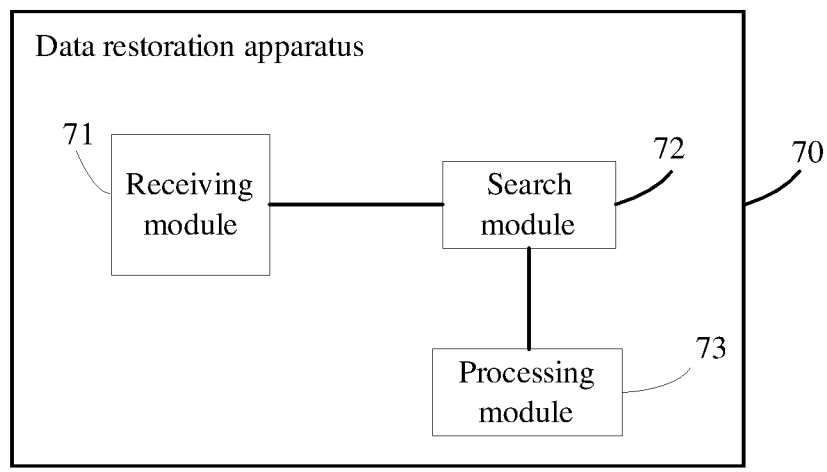
FIG. 7 is a structural diagram of another data restoration apparatus according to an embodiment.

FIG. 7 is a structural diagram of another data restoration apparatus according to an embodiment. As shown in FIG. 7, a data restoration apparatus 70 provided in this embodiment may be deployed in a backup server 110, and is further configured to perform the data restoration method shown in FIG. 6. Specifically, the data restoration apparatus 70 includes a receiving module 71, a search module 72, and a processing module 73. The receiving module 71 is connected to the search module 72, and the search module 72 is connected to the processing module 73. Functions of the modules in the data restoration apparatus 70 are described below.

The receiving module 71 is configured to receive a data restoration request. The data restoration request includes a target disk identifier and an identifier of backup data, the data restoration request is used to instruct to restore the backup data to a target disk corresponding to the target disk identifier, and the backup data includes several data slices.

In this implementation, a function of receiving a data restoration request by the receiving module 71 may be implemented by using an interface 311 in the backup server 110. For specific implementation details, refer to the specific details of step S650 shown in FIG. 6. Details are not described herein again.

The search module 72 is configured to search for metadata of the backup data based on the identifier of the backup data, where the metadata of the backup data includes a deduplication index, the deduplication index is used to indicate a data slice backed up in a storage device 120, the metadata of the backup data further includes metadata corresponding to the deduplication index, a same deduplication index corresponds to metadata of a plurality of data slices having same data content, and the metadata of the data slice is used to describe a distribution location of the data slice in the backup data.

The search module 72 is further configured to search for the data slice to which the deduplication index points and that is located in the storage device 120.

The processing module 73 is configured to write the data slice to the target disk based on a correspondence between the deduplication index and all metadata corresponding to the deduplication index and based on a distribution location described in each piece of metadata corresponding to the deduplication index.

In this implementation, the search module 72 and the processing module 73 may be implemented by a control module 330 or a processor 313 in the backup server 110. For specific implementation details, refer to the related steps described in FIG. 6. In another implementation, the search module 72 and the processing module 73 may be deployed on one physical chip, or may be separately and independently deployed. A specific deployment form is not limited by the details of this embodiment.

According to the data restoration apparatus shown in FIG. 7, before the data restoration apparatus 70 receives the data restoration request by using the receiving module 71, the processing module 73 of the data restoration apparatus 70 is further configured to: slice the backup data to obtain several data slices, and generate metadata of each data slice. The several data slices include a first data slice. The processing module 73 is further configured to: determine that data content of the first data slice is different from data content of all the data slices that are in the backup data and that are backed up in the storage device 120, back up the first data slice to the storage device 120, and create a deduplication index for the first data slice backed up in the storage device 120, where all the data slices backed up in the storage device 120 have different data content. The processing module 73 is further configured to: store a correspondence between the deduplication index of the first data slice backed up in the storage device 120 and metadata of the first data slice, and store a correspondence between the identifier of the backup data and the metadata of the backup data, where the metadata of the backup data includes the correspondence between the deduplication index of the first data slice backed up in the storage device 120 and the metadata of the first data slice. In this implementation, for a manner of obtaining, by the processing module 73, information included in the metadata of the backup data, refer to the details of the foregoing steps S620 and S630. Details are not described herein again.

According to the data restoration apparatus shown in FIG. 7, before the data restoration apparatus 70 receives the data restoration request by using the receiving module 71, the processing module 73 of the data restoration apparatus 70 is further configured to: slice the backup data into several data slices, and generate metadata of each data slice, where the several data slices include a second data slice. The processing module 73 is further configured to: determine that data content of the second data slice is the same as data content of a third data slice that is in the backup data and that is backed up in the storage device 120; store a correspondence between a deduplication index of the third data slice and metadata of the second data slice; and store a correspondence between the identifier of the backup data and the metadata of the backup data, where the metadata of the backup data includes the correspondence between the deduplication index of the third data slice and the metadata of the second data slice. In this implementation, for a manner of obtaining, by the processing module 73, information included in the metadata of the backup data, refer to the details of the foregoing step S621. Details are not described herein again.

According to the data restoration apparatus shown in FIG. 7, the processing module 73 is further configured to: determine a quantity of pieces of all metadata corresponding to the deduplication index, and store a correspondence between the deduplication index and the quantity of pieces of all the metadata corresponding to the deduplication index.

According to the data restoration method shown in FIG. 6 and the data restoration apparatus shown in FIG. 7, before restoring the backup data, the backup server 110 may create the metadata of the backup data. The metadata of the backup data includes the correspondence between the same deduplication index corresponding to the data slices having the same data content and the metadata of each of all the data slices having the same data content, and includes the correspondence between different deduplication indexes corresponding to the data slices having different data content and the metadata of each of the data slices having different data content. In this way, when restoring the backup data, the backup server 110 determines, based on a correspondence that is between a deduplication index and metadata and that is in the metadata of the backup data, all the metadata corresponding to each deduplication index. Then, after obtaining the data slice to which the deduplication index points and that is stored in the storage device 120, the backup server 110 stores the data slice to the distribution location described in each piece of metadata corresponding to the deduplication index. For restoration of a plurality of data slices that have same data content and that correspond to a same deduplication index, the storage device 120 is prevented from being frequently accessed to obtain, many times, the data slice to which the deduplication index points and that is stored in the storage device 120, a service life of the storage device 120 is prolonged, communication load between the backup server 110 and the storage device 120 is reduced, and data restoration efficiency is improved.

In the several embodiments provided, it should be understood that the disclosed system, apparatus, and method may be implemented in other manners. For example, the described apparatus embodiment is merely an example. For example, the module division is merely logical function division and may be other division in actual implementation. For example, a plurality of modules or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or modules may be implemented in electrical, mechanical, or other forms.

The modules described as separate parts may or may not be physically separate, and parts displayed as modules may or may not be physical modules, may be located in one location, or may be distributed on a plurality of network modules. Some or all the modules may be selected according to actual needs to achieve the objectives of the solutions of the embodiments.

In addition, functional modules in the embodiments may be integrated into one processing module, or each of the modules may exist alone physically, or two or more modules may be integrated into one module. The integrated module may be implemented in a form of hardware, or may be implemented in a form of a hardware and software functional module.

When the foregoing integrated unit is implemented in a form of a software functional module, the integrated unit may be stored in a computer-readable storage medium. The software functional module is stored in a storage medium and includes several instructions for instructing a computer device (which may be a personal computer, a server, a network device, or the like) to perform some of the steps of the methods described in the embodiments. The storage medium includes any medium that can store program code, such as a removable hard disk, a read-only memory, a random access memory, a magnetic disk, or a compact disc.

Finally, it should be noted that the foregoing embodiments are merely intended for describing the technical solutions, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the protection scope of the technical solutions of the embodiments

What is claimed is:

1. A data restoration method implemented by a backup server executing instructions stored on a non-transitory computer-readable medium, the data restoration method comprising:
   receiving a data restoration request comprising a target disk identifier, comprising a backup data identifier of backup data, and instructing restoration of the backup data to a target disk corresponding to the target disk identifier, wherein the backup data comprise a first data slice;
   searching for first metadata of the first data slice based on the backup data identifier;

searching for a deduplication index corresponding to the first metadata and indicating that the first data slice is backed up in a storage device;

obtaining distribution locations described in all metadata corresponding to the deduplication index;

storing a first correspondence between the deduplication index and the distribution locations;

searching, based on the deduplication index, for the first data slice in the storage device; and writing the first data slice to the distribution locations in the target disk.

2. The data restoration method of claim 1, further comprising querying a deduplication index table based on the backup data identifier.

3. The data restoration method of claim 2, further comprising querying the deduplication index in the deduplication index table.

4. The data restoration method of claim 3, further comprising determining a quantity of pieces of metadata corresponding to the deduplication index.

5. The data restoration method of claim 4, further comprising storing a second correspondence between the deduplication index and the quantity.

6. A backup server comprising:

a memory configured to store a software program; and a processor coupled to the memory and configured to run the software program to:

receive a data restoration request comprising a target disk identifier, comprising a backup data identifier of backup data, and instructing restoration of the backup data to a target disk corresponding to the target disk identifier, wherein the backup data comprise a first data slice;

search for first metadata of the first data slice based on the backup data identifier;

search for a deduplication index corresponding to the first metadata and indicating that the first data slice is backed up in a storage device;

obtain distribution locations described in all metadata corresponding to the deduplication index;

store a first correspondence between the deduplication index and the distribution locations;

search, based on the deduplication index, for the first data slice in the storage device; and write the first data slice to the distribution locations in the target disk.

7. The backup server of claim 6, wherein the processor is further configured to query a deduplication index table based on the backup data identifier.

8. The backup server of claim 7, wherein the processor is further configured to query the deduplication index in the deduplication index table.

9. The backup server of claim 8, wherein the processor is further configured to determine a quantity of pieces of metadata corresponding to the deduplication index.

10. The backup server of claim 9, wherein the processor is further configured to store a second correspondence between the deduplication index and the quantity.

11. A data restoration method implemented by a backup server executing instructions stored on a non-transitory computer-readable medium, the data restoration method comprising:

receiving a data restoration request comprising a target disk identifier, comprising a backup data identifier of backup data, and instructing restoration of the backup data to a target disk corresponding to the target disk identifier, wherein the backup data comprise a first data slice;

searching for first metadata of the backup data based on the backup data identifier, wherein the first metadata comprise a first deduplication index and second metadata of the first data slice, wherein the first deduplication index indicates that the first data slice is backed up in a storage device, and wherein the second metadata describe a first distribution location of the first data slice;

obtaining distribution locations described in all metadata corresponding to the first deduplication index, wherein the all metadata comprise the first metadata;

searching, based on the first deduplication index, for the first data slice in the storage device; and writing the first data slice to the distribution locations in the target disk.

12. The data restoration method of claim 11, wherein before receiving the data restoration request, the data restoration method further comprises slicing the backup data to obtain data slices.

13. The data restoration method of claim 12, wherein before receiving the data restoration request, the data restoration method further comprises generating metadata of each of the data slices, wherein the data slices comprise the first data slice.

14. The data restoration method of claim 13, wherein before receiving the data restoration request, the data restoration method further comprises:

determining that data content of the first data slice is different from data content of any other data slices that are in the backup data and are backed up in the storage device;

backing up the first data slice to the storage device; and creating the first deduplication index, wherein all data slices backed up in the storage device have different data content.

15. The data restoration method of claim 14, wherein before receiving the data restoration request, the data restoration method further comprises generating the first metadata.

16. The data restoration method of claim 15, wherein before receiving the data restoration request, the data restoration method further comprises storing a second correspondence between the backup data identifier and the first metadata.

17. The data restoration method of claim 11, wherein before receiving the data restoration request, the data restoration method further comprises:

slicing the backup data into data slices; and generating metadata of each of the data slices, wherein the data slices comprise a second data slice.

18. The data restoration method of claim 17, wherein before receiving the data restoration request, the data restoration method further comprises determining that second data content of the second data slice is the same as third data content of a third data slice that is in the backup data and that is backed up in the storage device.

19. The data restoration method of claim 18, wherein before receiving the data restoration request, the data restoration method further comprises storing a second correspondence between a second deduplication index of the third data slice and third metadata of the second data slice, and wherein the third metadata describe a second distribution location of the second data slice.

20. The data restoration method of claim 19, wherein before receiving the data restoration request, the data restoration method further comprises storing a third correspondence between the backup data identifier and the first metadata, wherein the first metadata comprise the second correspondence.

* * * * *